United States Patent
Seko (10) Patent No.: US 9,864,935 B2
(45) Date of Patent: Jan. 9, 2018

(54) PRINTING DATA PROCESSING DEVICE, NON-TRANSITORY STORAGE MEDIUM, AND IMAGE FORMING APPARATUS

(71) Applicant: KYOCERA DOCUMENT SOLUTIONS INC., Osaka-shi (JP)

(72) Inventor: Toshihiro Seko, Osaka (JP)

(73) Assignee: KYOCERA DOCUMENT SOLUTIONS INC., Osaka-shi (JP)

( * ) Notice: Subject to any disclaimer, the term of this patent is extended or adjusted under 35 U.S.C. 154(b) by 311 days.

(21) Appl. No.: 14/380,695

(22) PCT Filed: Feb. 15, 2013

(86) PCT No.: PCT/JP2013/053688
§ 371 (c)(1),
(2) Date: Aug. 22, 2014

(87) PCT Pub. No.: WO2013/129138
PCT Pub. Date: Sep. 6, 2013

(65) Prior Publication Data
US 2015/0015904 A1 Jan. 15, 2015
US 2017/0154250 A9 Jun. 1, 2017

(30) Foreign Application Priority Data
Feb. 29, 2012 (JP) ................................ 2012-044331

(51) Int. Cl.
*G06K 15/02* (2006.01)
(52) U.S. Cl.
CPC ....... *G06K 15/1827* (2013.01); *G06K 15/181* (2013.01)

(58) Field of Classification Search
None
See application file for complete search history.

(56) References Cited

U.S. PATENT DOCUMENTS 8,237,955 B2   8/2012   Mori
2004/0021892 A1*  2/2004   Ueda ............... G06K 15/00
                                          358/1.14
(Continued)

FOREIGN PATENT DOCUMENTS

JP   02-156325 A   6/1990
JP   08-063309 A   3/1996
(Continued)

OTHER PUBLICATIONS

Office Action dated Aug. 15, 2014 in corresponding Japan Patent Application No. 2013-044331.

*Primary Examiner* — Marivelisse Santiago Cordero
*Assistant Examiner* — Keara Harris
(74) *Attorney, Agent, or Firm* — Knobbe Martens Olson & Bear LLP (57) ABSTRACT

The present invention is characterized by including: an analysis processing unit 19 that can analyze PDL data of a particular PDL; a text counter 21 that counts the number of processes of codes outside of a character-assigned range during a text process based on a character code table in the analysis by the analysis processing unit 19; and an interruption unit 23 that interrupts the analysis of the PDL data when the counted number by the text counter 21 exceeds a predetermined first threshold.

6 Claims, 5 Drawing Sheets

(56) References Cited

U.S. PATENT DOCUMENTS

| | | | |
|---|---|---|---|
| 2005/0200880 A1* | 9/2005 | Oshiumi | G06F 3/1222 358/1.14 |
| 2006/0215198 A1 | 9/2006 | Yorimoto | |
| 2007/0076247 A1* | 4/2007 | Mori | G06F 3/1204 358/1.15 |

FOREIGN PATENT DOCUMENTS

| | | |
|---|---|---|
| JP | 09-081342 A | 3/1997 |
| JP | 2003-280839 A | 10/2003 |
| JP | 2007-069359 A | 10/2006 |
| JP | 2006-270796 A | 3/2007 |
| JP | 2009-125990 A | 6/2009 |
| JP | 2010-284924 A | 12/2010 |

* cited by examiner

|   | 0 | 1 | 2 | 3 | 4 | 5 | 6 | 7 |
|---|---|---|---|---|---|---|---|---|
| 0 | NULL | TC7 | SP | 0 | @ | P | ` | p |
| 1 | TC1 | DC1 | ! | 1 | A | Q | a | q |
| 2 | TC2 | DC2 | " | 2 | B | R | b | r |
| 3 | TC3 | DC3 | # | 3 | C | S | c | s |
| 4 | TC4 | DC4 | $ | 4 | D | T | d | t |
| 5 | TC5 | TC8 | % | 5 | E | U | e | u |
| 6 | TC6 | TC9 | & | 6 | F | V | f | v |
| 7 | BEL |RC10 | ' | 7 | G | W | g | w |
| 8 | FE0 | CAN | ( | 8 | H | X | h | x |
| 9 | FE1 | EM | ) | 9 | I | Y | i | y |
| A | FE2 | SUB | * | : | J | Z | j | z |
| B | FE3 | ESC | + | ; | K | [ | k | { |
| C | FE4 | Is4 | , | < | L | ¥ | l | \| |
| D | FE5 | IS3 | - | = | M | ] | m | } |
| E | SO | IS2 | . | > | N | ^ | n | ~ |
| F | SI | IS1 | / | ? | O | _ | o | DEL |

PRINTING DATA PROCESSING DEVICE, NON-TRANSITORY STORAGE MEDIUM, AND IMAGE FORMING APPARATUS

CROSS-REFERENCE TO RELATED APPLICATIONS

This application is the U.S. National Phase under 35. U.S.C. §371 of International Application PCT/JP2013/053688, Feb. 15, 2013, which claims priority to Japanese Patent Application No. 2012-044331, filed Feb. 29, 2012. The disclosures of the above-described applications are hereby incorporated by reference in their entirety. The International Application was published under PCT Article 21(2) in a language other than English.

TECHNICAL FIELD

The present invention relates to a printing data processing device that analyzes printing data, a non-transitory storage medium, and an image forming apparatus.

BACKGROUND ART

In general, upon printing of a document, an image, and the like that are created on a computer, printing data in a predetermined PDL (Page Description Language) is generated and a printing instruction is made by outputting the printing data to a printer. The printer analyzes the printing data by means of a PDL analysis unit (printing data processing device) and can output by printing through an image forming process (process of forming an image) and the like.

As a PDL used for printing data, PostScript and PCL (Printer Control Language) have been predominant. However, in recent years, PDF (Portable Document Format) which is an electronic document format, HTML (HyperText Markup Language) and XML (Extensible Markup Language) which are markup languages, as well as XPS (XML Paper Specification) which is a new electronic document format are used.

In such a situation with various PDLs, a plurality of PDL analysis units corresponding to respective PDLs should be provided and switched according to the PDL of the printing data.

Switching of the PDL analysis unit has been realized either automatically based on printing data, or through emulation by setting the PDL of a printer main body from an operation panel.

However, in a case of setting the PDL of a printer main body from an operation panel, analyzable PDLs are fixed. Printing data in other PDLs causes an analysis error.

In a case of such an analysis error, a garbage output is caused. A garbage output is printing of information in the printing data as a text. As the PDL analysis unit analyzes the printing data to the end, a huge amount of the garbage output tends to be made.

In order to address this, Patent Document 1 discloses a technique of switching to another PDL analysis unit in a case of an error in any of a plurality of PDL analysis units.

However, this technique cannot be applied to a case in which the PDL analysis unit is fixed. In other words, this technique has a problem of not being able to suppress output of error pages such as garbage output without switching the PDL analysis unit.

Patent Document 1: Japanese Unexamined Patent Application Publication No. 2003-280839

DISCLOSURE OF THE INVENTION

Problems to be Solved by the Invention

A problem to be solved by the present invention is inability to suppress output of error pages without switching a printing data processing device.

Means for Solving the Problems

A printing data processing device of the present invention is characterized by including:
an analysis processing unit that can analyze printing data in a particular language;
a text counter that counts the number of processes of codes outside of a character-assigned range during a text process based on character code group, upon an analysis by the analysis processing unit; and
an interruption unit that interrupts the analysis of the printing data in a case in which the counted number by the text counter exceeds a predetermined first threshold.

A storage medium of the present invention is
a computer-readable non-transitory storage medium that stores a printing data processing program,
in which the printing data processing program makes a computer execute:
an analysis process step that can analyze printing data in a particular language;
a text count step that counts the number of processes of codes outside of a character-assigned range during a text process based on character code group, in the analysis process step; and
an interruption step that interrupts the analysis of the printing data in a case in which the counted number in the text count step exceeds a predetermined first threshold.

An image forming apparatus of the present invention includes: a printing data processing device; and an output engine unit that outputs printing data, which is analyzed by the printing data processing device, by printing. The printing data processing device includes:
an analysis processing unit that can analyze printing data in a particular language;
a text counter that counts the number of processes of codes outside of a character-assigned range during a text process based on character code group, upon an analysis by the analysis processing unit; and
an interruption unit that interrupts the analysis of the printing data in a case in which the counted number by the text counter exceeds a predetermined first threshold.

PREFERRED MODE FOR CARRYING OUT THE INVENTION

An objective of suppressing output of error pages without switching a printing data processing device has been accomplished by the following measures. That is, the objective has been accomplished by interrupting an analysis of printing data, once the number of processes of codes outside of a character-assigned range reaches a predetermined first threshold during a text process based on a character code group.

An embodiment is an application of the present invention to an image forming apparatus with a plurality of printing data processing devices. However, the present invention can also be applied to an image forming apparatus with only one printing data processing device.

An embodiment of the present invention is described hereinafter with reference to the drawings.

[Image Forming Apparatus]

Figure 1:
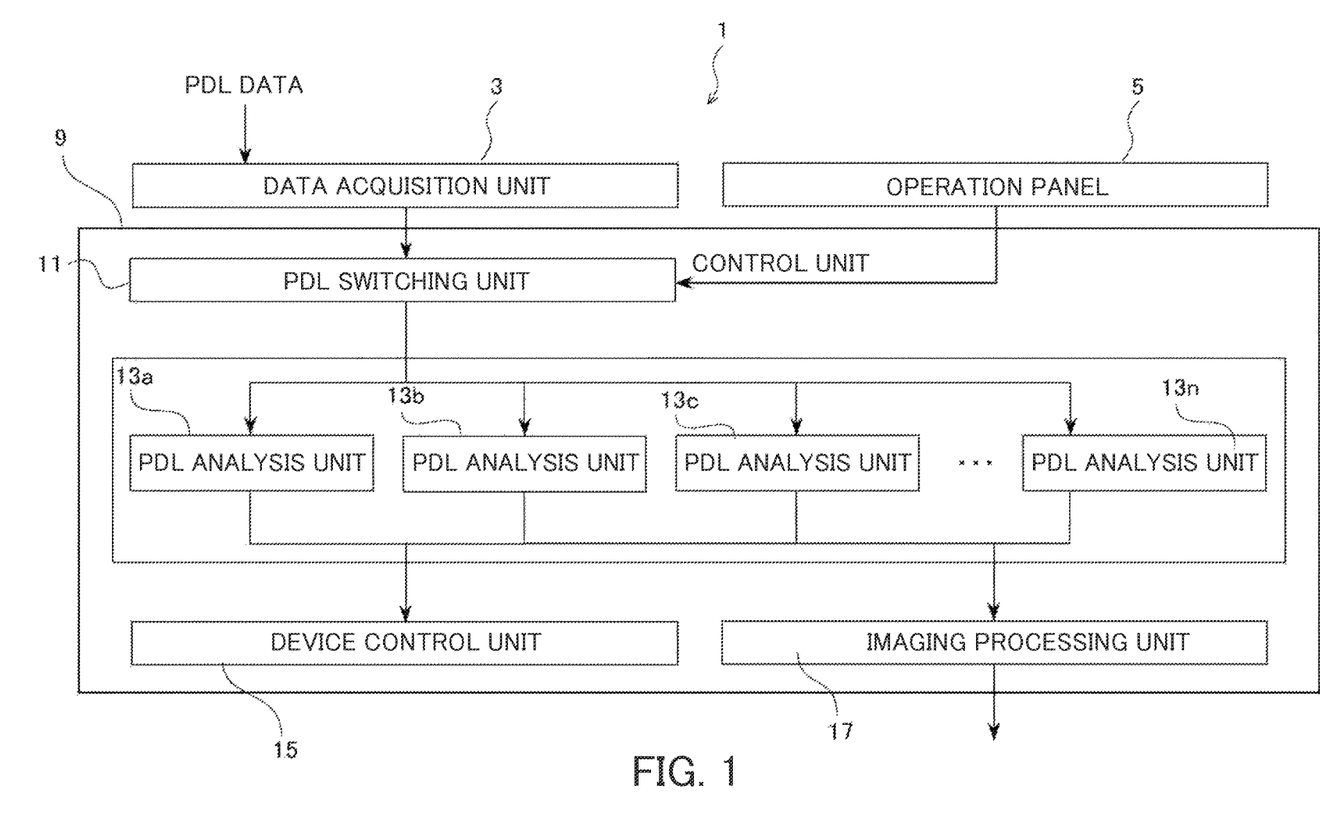
FIG. 1 is a block diagram illustrating a schematic configuration of a major part of an image forming apparatus with a PDL analysis unit.

FIG. 1 relates to an embodiment of the present invention and is a block diagram illustrating a schematic configuration of a major part of an image forming apparatus with a PDL analysis unit.

An image forming apparatus 1 of FIG. 1 is composed of a printer such as a digital multi-function peripheral having at least a function of outputting by printing. The image forming apparatus 1 makes an output by printing based on PDL data as printing data being input. The image forming apparatus 1 of the present embodiment is provided with a data acquisition unit 3, an operation panel 5, and a control unit 9.

The data acquisition unit 3 is an interface that receives the PDL (Page Description Language) data from other devices.

The operation panel 5 is composed of a liquid crystal display window of a touch-screen type and the like. The operation panel 5 allows operational input to the image forming apparatus 1 and display of an operation status.

The control unit 9 is a control element such as a CPU (Central Process Unit). The control unit 9 allows various control and operations of the image forming apparatus 1 by executing a program stored in a memory M including ROM (Read Only Memory) and a storage unit such as a hard disk.

In the present embodiment, the control unit 9 executes a printing data processing program in the storage unit. The control unit 9 is provided with, as functional configuration, a PDL switching unit 11, PDL analysis units 13a, 13b, 13c, . . . 13n as the plurality of printing data processing devices, a device control unit 15, and an imaging processing unit 17.

The PDL switching unit 11 switches and activates the PDL analysis units 13a, 13b, 13c, . . . 13n. The PDL switching unit 11 switches the PDL analysis unit in a fixed way, according to setting from the operation panel 5. In addition, the PDL switching unit 11 analyzes a header of the PDL data being input and switches to the corresponding PDL analysis unit in a selective way.

The PDL analysis units 13a, 13b, 13c, . . . 13n correspond to different PDLs respectively. The PDL analysis units 13a, 13b, 13c, . . . 13n read and analyze the PDL data as being activated. Each of the PDL analysis unit generates intermediate data from the PDL data thus analyzed and outputs to the imaging processing unit 17. The PDL analysis units 13a, 13b, 13c, . . . 13n are described later in detail.

The imaging processing unit 17 performs an imaging process of forming an image of imaging in the bitmap format, from the intermediate data thus input, in response to an instruction from the PDL analysis units 13a, 13b, 13c, . . . 13n. An ultimate output image is formed from the image of imaging, through a screening process and the like. The output image is output by printing by an output engine unit.

The device control unit 15 configures a device such as a tray used for output of printing, in response to an instruction from the PDL analysis units 13a, 13b, 13c, . . . 13n.

[PDL Analysis Unit]

Figure 2:
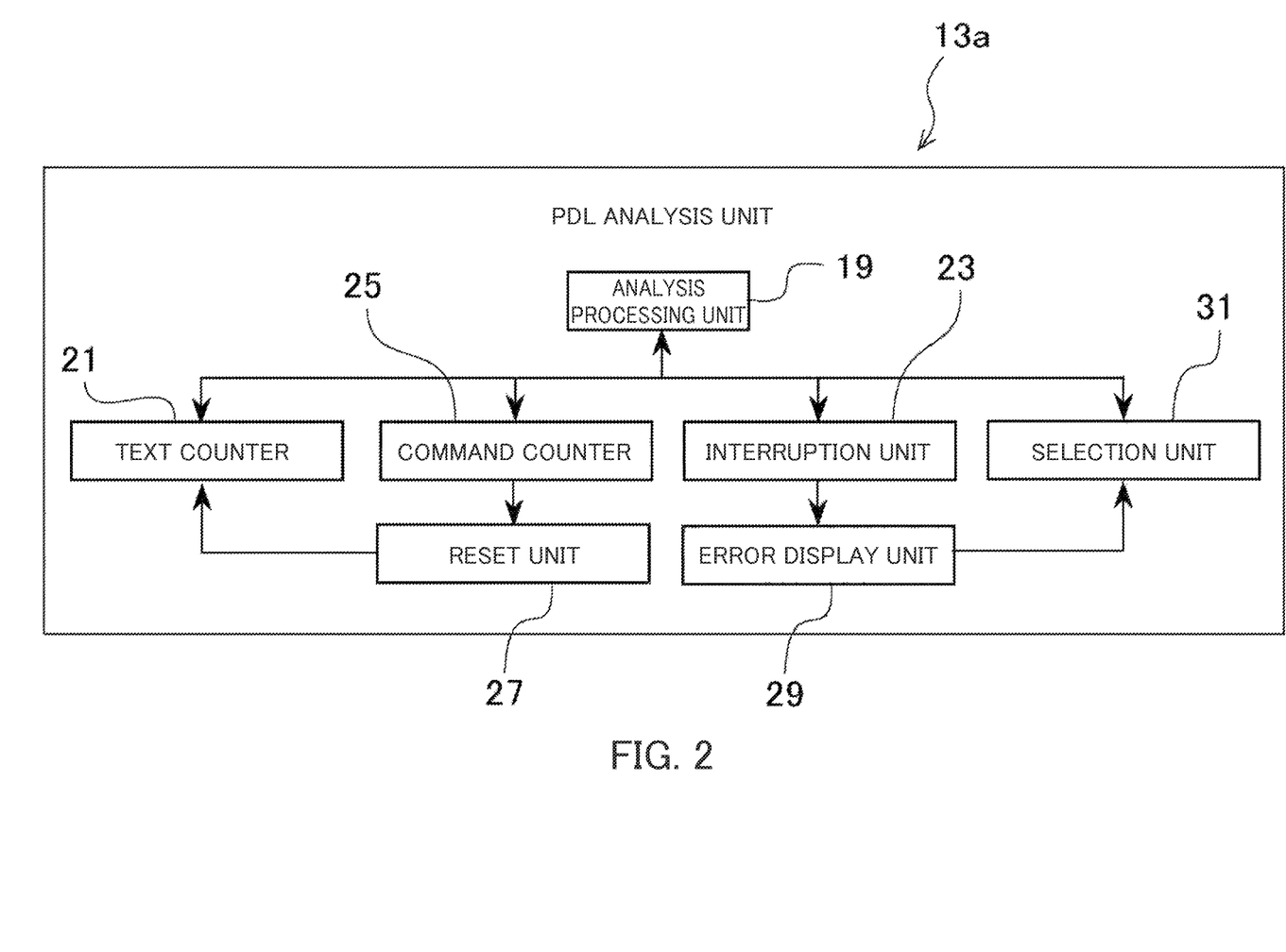
FIG. 2 is a block diagram illustrating a configuration of the PDL analysis unit in FIG. 1.

FIG. 2 is a block diagram illustrating a configuration of the PDL analysis unit in FIG. 1. The PDL analysis units 13a, 13b, 13c, . . . 13n correspond to different PDLs, but have a common functional configuration. Given this, only the PDL analysis unit 13a is described in detail.

During a text process based on a character code table (character code group) of the PDL data, the PDL analysis unit 13a determines that there is an analysis error and interrupts the analysis process in a case in which the number of processes of codes outside of a character-assigned range (hereinafter referred to as "out-of-range codes") is greater than in a normal analysis process.

In the present embodiment, the analysis error is determined by the PDL analysis unit 13a analyzing the PDL data in a non-compliant PDL. In other words, in a case of analyzing the non-compliant PDL data, the occurrence of the out-of-range codes increases as the information of the PDL data is processed as is as text. The increase of the occurrence of the out-of-range codes is considered to be the analysis error.

The PDL analysis unit 13a is provided with an analysis processing unit 19, a text counter 21, an interruption unit 23, a command counter 25, a reset unit 27, an error display unit 29, and a selection unit 31.

The analysis processing unit 19 reads and analyzes the PDL data. The analysis processing unit 19 can analyze the PDL data in a particular PDL (compliant PDL).

Figure 3:
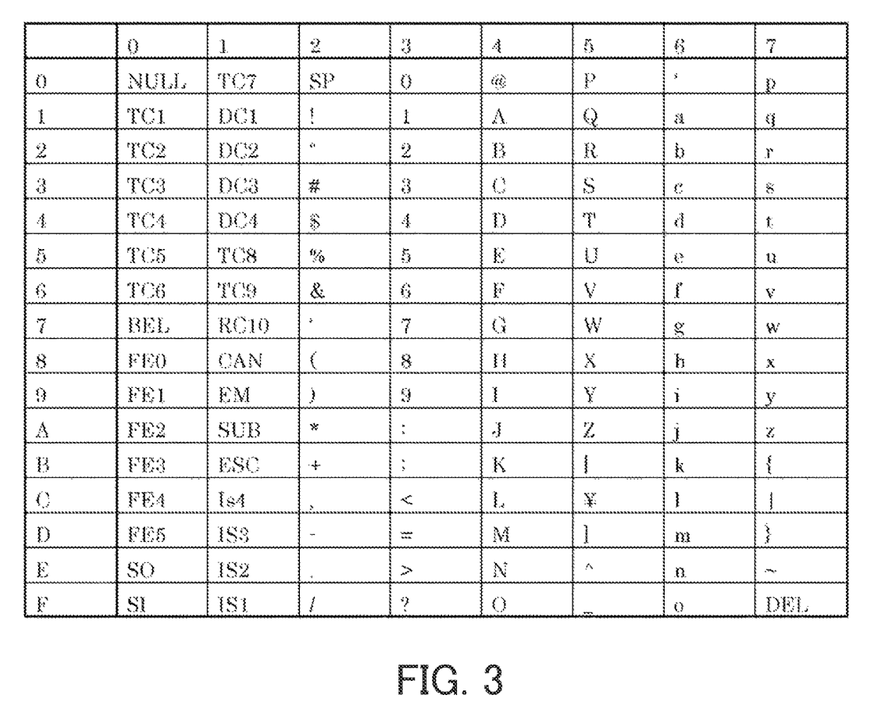
FIG. 3 is a diagram showing an ASCII code table.

During the analysis, the analysis processing unit 19 performs a text process based on the character code table with respect to the character codes in the PDL data. The analysis processing unit 19 performs processes other than the text process (for example, an image process) with respect to a particular command (for example, a start command for the image process), through a command process (for example, a start for the image process), which is an execution thereof. It should be noted that, as the character code table, various character code tables such as Shift JIS and ASCII can be exemplified. In the present embodiment, a description is given by way of the ASCII code table shown in FIG. 3. FIG. 3 is a diagram showing an ASCII code table.

The text counter 21 counts the number of processes of the out-of-range codes during the text process in the PDL data analysis.

In the ASCII code table of FIG. 3, 0x00 to 0x1F are control codes and not assigned with a character. In this ASCII code table, no character is assigned to codes 0x80 and later.

Given this, in the present embodiment, these codes are regarded as the out-of-range codes. The text counter 21 counts the number of processes of the out-of-range codes.

The interruption unit 23 interrupts the analysis of the PDL data when the counted number by the text counter 21 reaches a predetermined first threshold. The first threshold is set in a range of allowing detection of the number of processes of the out-of-range codes that is greater than in a normal analysis process, as described above. The first threshold can be set to be, for example, 100 and the like. However, the first threshold is arbitrary and can be changed as necessary according to the processing speed of the analysis processing unit 19 and the PDL.

The command counter 25 counts the number of processes of the command process in the PDL data analysis.

The reset unit 27 resets the counted number by the text counter 21 when the counted number by the command counter 25 exceeds a predetermined second threshold. In other words, the reset unit 27 resets the counted number by the text counter 21 in a case in which the process is a normal analysis process.

Determination of being a normal analysis process is based on a fact that the PDL data is likely to be compliant to the PDL analysis unit 13a in a case in which the command process (execution of commands) is possible.

For Example, in order to perform an image process, a command for initiating the image process is necessary. Possible execution of the command means that the PDL data is correctly processed. Therefore, the possible execution of the command means that a possibility of wrong combination between the PDL data and the PDL analysis unit is low.

Regarding the second threshold for the reset unit 27, once the command process is executed, the process can be determined to be a normal analysis process. Therefore, the second threshold for the reset unit 27 can be set to at least 1. However, taking into consideration of the margin of error and processing speed of the analysis processing unit 19, the second threshold for the reset unit 27 is set to, for example, on the order of 20.

The error display unit 29 displays an analysis error on the operation panel 5 of the image forming apparatus 1 upon interruption of the analysis of the PDL data.

The selection unit 31 allows selection of termination or resumption of the interrupted analysis on the operation panel 5, in response to display of an analysis error by the error display unit 29.

[Operation of PDL Analysis Unit]

Figure 4:
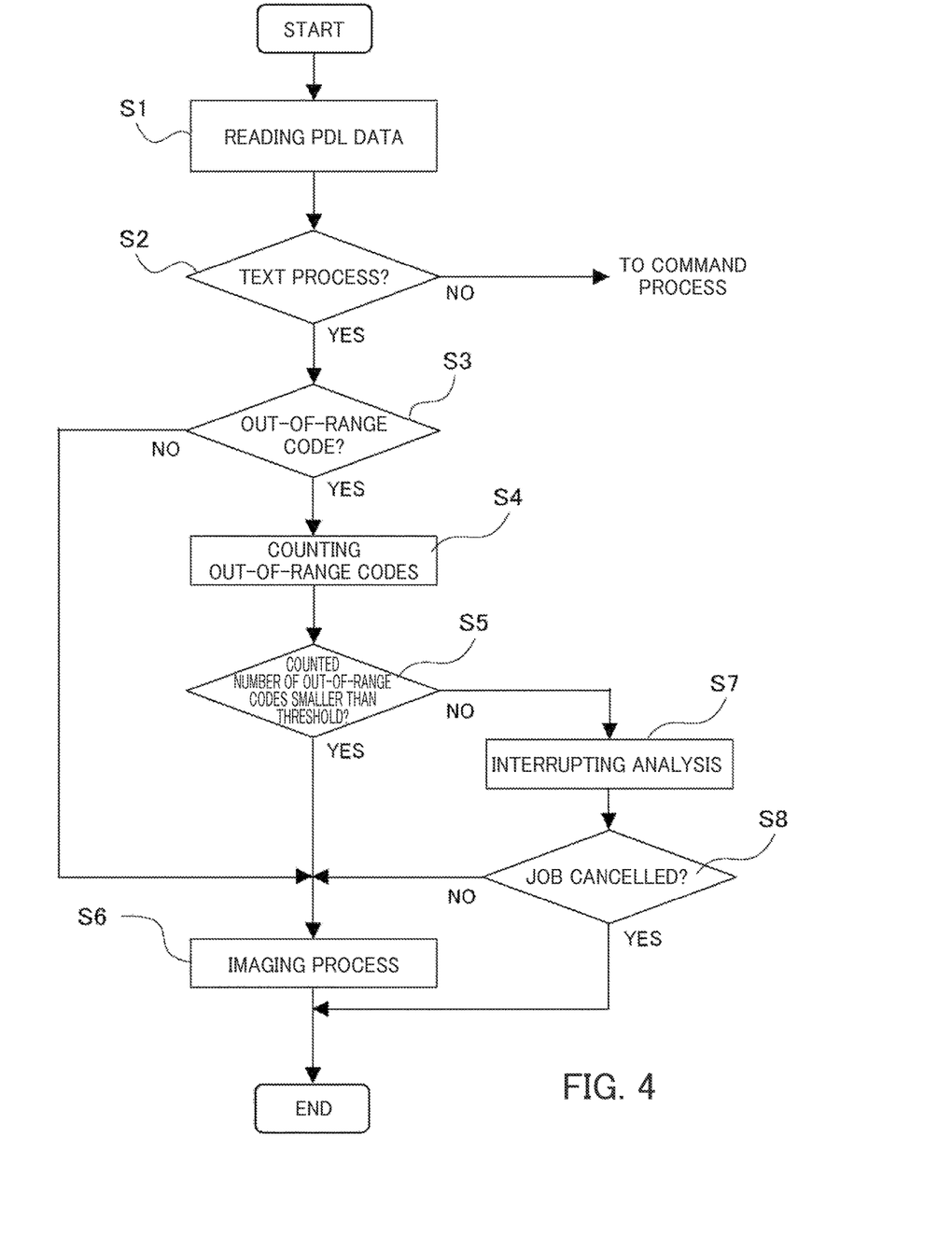
FIG. 4 is a flow chart showing an analysis process of PDL data by the PDL analysis unit.

FIG. 4 is a flow chart showing an analysis process (analysis steps) of the PDL data by the PDL analysis unit.

The flow chart of FIG. 4 starts with activation of any one of the PDL analysis units 13a, 13b, 13c, . . . 13n by the PDL switching unit 11, according to setting by the operation panel 5 in FIG. 1.

In Step S1, the analysis processing unit 19 reads the PDL data. In other words, the analysis processing unit 19 of the PDL analysis unit thus started up reads the PDL data and starts analysis. The processing is then advanced to Step S2.

In Step S2, the command counter 25 determines whether the text process is performed or not. In this process, the command counter 25 detects whether the analysis processing unit 19 performs the processes of the commands in the PDL data or not.

In a case in which the command process is not performed, the text processing of the PDL data is considered to be performed (YES), and the processing is advanced to Step S3. On the other hand, in a case in which the command process is performed, a process other than the text processing is performed based on the command (NO), and the processing is advanced to the command process.

In Step S3, the text counter 21 determines whether a character code is an out-of-range code or not (text count step). In this processing, the text counter 21 detects whether a character code in the text process is an out-of-range code or not. The out-of-range codes are 0x00 to 0x1F and 0x80 and later.

In a case in which the character code is an out-of-range code (YES), the processing is advanced to Step S4. In a case in which the character code is not an out-of-range code (in-range code) (NO), the processing is advanced to Step S6.

In Step S4, the text counter 21 counts the out-of-range codes (text count step). In this process, the text counter 21 counts the number of out-of-range codes being detected. The processing then advances to Step S5.

In Step S5, the interruption unit 23 determines whether the counted number of the out-of-range codes is no greater than the first threshold or not (interruption step). In this process, the interruption unit 23 determines whether the counted number by the text counter 21 is no greater than the predetermined first threshold or not. In a case in which the counted number is no greater than the first threshold, the processing is advanced to Step S6. In a case in which the counted number exceeds the first threshold, the processing is advanced to Step S7.

In Step S6, the imaging processing unit 17 performs the imaging process. In other words, the analysis processing unit 19 performs a process of generating intermediate data for the character code being processed. The imaging processing unit 17 generates an image in the bitmap format based on the intermediate data.

Meanwhile, in Step S7, the interruption unit 23 interrupts the analysis (interruption step). In other words, the interruption unit 23 determines that an analysis error, in which the number of processes of the out-of-range codes is greater than the normal analysis process, occurs and interrupts the analysis process of the PDL data by the analysis processing unit 19. A process of Step S7 is thus completed, and the processing is advanced to Step S8.

In Step S8, the error display unit 29 determines whether a job is cancelled or not (error display step and selection step). In this process, the error display unit 29 displays an analysis error of the PDL data on the operation panel 5 of the image forming apparatus 1. In response to this, the selection unit 31 allows a user to select termination or resumption of the interrupted analysis process on the operation panel 5.

In a case in which the user selects termination (YES), a printing job for the PDL data is terminated (analysis process is terminated), thus terminating the processing of the flow chart of FIG. 4. This can suppress output of error pages such as the garbage output.

On the other hand, in a case in which resumption is selected (NO), the processing is advanced to Step S6 according to the user's preference. The imaging process is thus performed.

Figure 5:
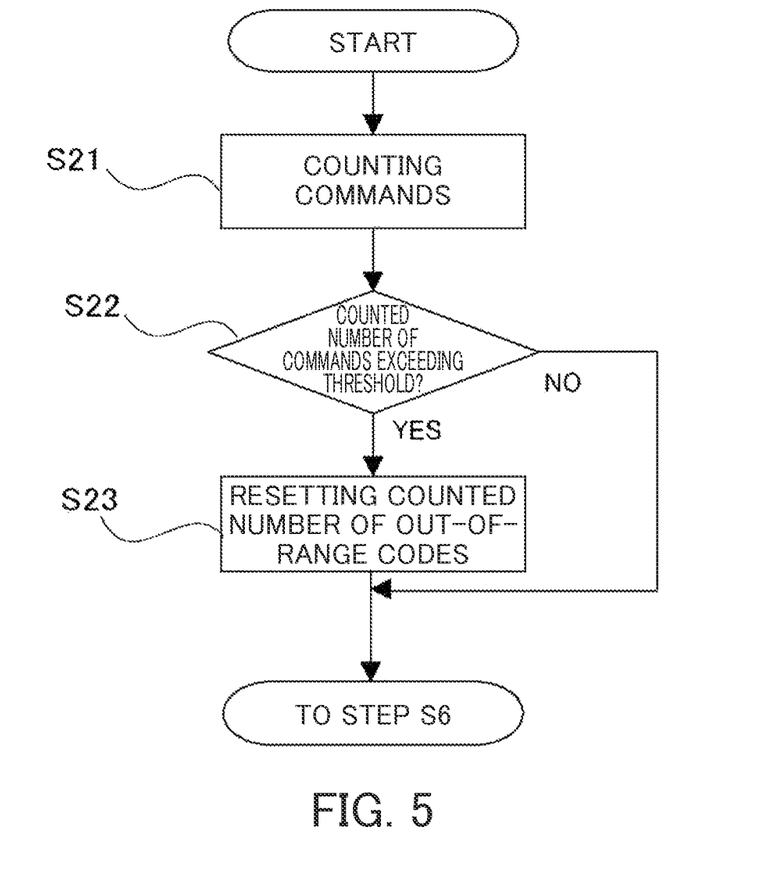
FIG. 5 is a flow chart showing a command process.

FIG. 5 is a flow chart showing the command process.

The flow chart in FIG. 5 starts with transition from Step S2 in FIG. 4 to the command process.

First, in Step S21, the command counter 25 counts the commands. In this process, the command counter 25 counts the command processes being detected. The processing then advances to Step S22.

In Step S22, the reset unit 27 determines whether the counted number of the commands is no greater than the second threshold or not. In this processing, the reset unit 27 determines whether the counted number by the command counter 25 is no greater than the predetermined second threshold or not.

In a case in which the counted number is no greater than the second threshold (NO), the processing is advanced to Step S6 in FIG. 4 and the imaging process is performed based on the command process. On the other hand, in a case in which the counted number exceeds the second threshold, the processing is advanced to Step S23.

In Step S23, the reset unit 27 resets the counted number of the out-of-range codes. In other words, the reset unit 27 determines that the process is a normal analysis process and resets the counted number by the text counter 21. This can prevent the analysis process from being erroneously interrupted even if an out-of-range code is counted during the next text process.

Step S23 is thus terminated and the processing is advanced to Step S6 in FIG. 4, thereby performing the imaging process based on the command process.

Effect of Embodiment

The PDL analysis unit 13a (13b, 13c, . . . 13n) of the present embodiment is provided with: the analysis processing unit 19 that can analyze the PDL data of a particular PDL; the text counter 21 that counts the number of processes of codes outside of a character-assigned range (out-of-range code) during the text process based on the character code table in the analysis by the analysis processing unit 19; and an interruption unit 23 that interrupts the analysis of the PDL data when the counted number by the text counter 21 exceeds the predetermined first threshold.

In other words, in the present embodiment, the interruption unit 23 determines that an analysis error, in which the number of processes of the out-of-range codes is greater than the normal analysis process, occurs, in a case in which the number of processes exceeds the first threshold. And then, the interruption unit 23 can interrupt the analysis process of the PDL data by the analysis processing unit 19. By interrupting the analysis process by the interruption unit 23 based on the number of processes of the out-of-range codes, output of error pages such as the garbage output can be suppressed without switching the PDL analysis unit.

In addition, the PDL analysis unit 13a of the present embodiment is provided with: the command counter 25 that counts the number of processes of the commands in the PDL data during the analysis; and the reset unit 27 that resets the counted number by the text counter 21 in a case in which the counted number by the command counter 25 exceeds the predetermined second threshold.

In other words, in the present embodiment, the reset unit 27 determines that the process is a normal analysis process when the number of processes of the commands in the PDL data exceeds the predetermined second threshold. And the reset unit 27 can reset the counted number by the text counter 21. This can therefore prevent the analysis process from being erroneously interrupted even if an out-of-range code is counted during the next text process, thereby allowing smooth processing.

In addition, the PDL analysis unit 13a of the present embodiment is provided with the selection unit 31 that allows selection of termination or resumption of the interrupted analysis of the PDL data.

As a result, the present embodiment can infallibly suppress output of error pages by ultimately interrupting the analysis of the PDL data, while allowing output of error pages according to the user's preference. This can improve the user's convenience.

In addition, the present embodiment is provided with the error display unit 29 that displays an error of the analysis upon interruption of the analysis of the PDL data. The selection unit 31 allows selection of termination or resumption, in response to display of the error.

As a result, the present embodiment can allow termination or resumption of the analysis, while notifying the user of the analysis error generated. This can improve the user's convenience while improving certitude of the selection.

In addition, the printing data processing program to be executed by a computer can be stored (recorded) non-temporarily in a computer-readable storage medium, such as ROM and a hard disk in the computer, an external storage device, or a portable storage medium.

The external storage device indicates a memory expansion device incorporating a storage medium such as a CD-ROM (Compact Disk-Read only Memory), that is externally connected to an electronic device. The portable storage medium indicates a storage medium that can be loaded into a storage medium driving device (drive device) and is portable, such as a flexible disk, a memory card, and a magneto optical disk.

And then, the program stored in the storage medium is loaded onto RAM and the like of the computer and executed by a CPU (control unit). This execution realizes a function of the computer.

What is claimed is:

1. A printing data processing device comprising:
   a memory that stores a program processing a printing data written in a page description language; and
   a processor that executes the program,
   wherein when the program is executed, the processor operates to:
   analyze a printing data written in a particular page description language;
   execute a text process based on character code group on a character code contained in the printing data written in the particular page description language;
   execute a command process on a command contained in the printing data written in the particular page description language;
   determine whether the character code undergoing the text process is outside of a character-assigned range during the text process based on the character code group, upon an analysis of the printing data written in the particular page description language;
   count a first number of processes of codes outside of the character-assigned range, when the character code undergoing the text process is outside of the character-assigned range;
   interrupt the analysis of the printing data in a case in which the first number thus counted exceeds a predetermined first threshold;
   count a second number of processes of commands executed on the command, except for the text process based on the character code group on the character code contained in the printing data written in the particular page description language upon the analysis; and
   reset the first number in a case in which the second number thus counted exceeds a predetermined second threshold.

2. The printing data processing device according to claim 1, wherein the processor further operates to allow selection of termination or resumption of the interrupted analysis.

3. The printing data processing device according to claim 2, wherein the processor further operates to:
   display an error of the analysis upon interruption of the analysis of the printing data; and
   allow the selection according to display of the error.

4. A computer-readable non-transitory storage medium that stores a program processing a printing data written in a page description language, the program causing a computer to execute:
   analyzing a printing data written in a particular page description language;
   executing a text process based on character code group on a character code contained in the printing data written in the particular page description language;
   executing a command process on a command contained in the printing data written in the particular page description language;
   determining whether the character code undergoing the text process is outside of a character-assigned range during the text process based on the character code group, upon an analysis of the printing data written in the particular page description language;

counting a first number of processes of codes outside of the character-assigned range, when the character code undergoing the text process is outside of the character-assigned range;

interrupting analyzing the printing data in a case in which the first number thus counted in counting exceeds a predetermined first threshold counting a second number of processes of commands executed on the command, except for the text process based on the character code group on the character code contained in the printing data written in the particular page description language upon analyzing; and resetting the first number in a case in which the second number thus counted exceeds a predetermined second threshold.

5. An image forming apparatus comprising: a printing data processing device, wherein the printing data processing device includes:

a memory that stores a program processing a printing data written in a page description language; and a processor that executes the program, wherein when the program is executed, the processor operates to:

analyze printing data written in a particular page description language;

execute a text process based on character code group on a character code contained in the printing data written in the particular page description language;

execute a command process on a command contained in the printing data written in the particular page description language;

determine whether the character code undergoing the text process is outside of a character-assigned range during the text process based on the character code group, upon an analysis of the printing data written in the particular page description language;

count a first number of processes of codes outside of the character-assigned range, when the character code undergoing the text process is outside of the character-assigned range;

interrupt the analysis of the printing data in a case in which the first number thus counted exceeds a predetermined first threshold;

count a second number of processes of commands executed on the command, except for the text process based on the character code group on the character code contained in the printing data written in the particular page description language upon the analysis;

reset the first number in a case in which the second number thus counted exceeds a predetermined second threshold; and output printing data, which is analyzed by the printing data processing device, by printing.

6. The image forming apparatus according to claim 5, wherein the image forming apparatus is provided with a plurality of printing data processing devices.

* * * * *